(12) United States Patent
Okubo et al.

(10) Patent No.: US 6,989,616 B2
(45) Date of Patent: Jan. 24, 2006

(54) MOTOR

(75) Inventors: Masayuki Okubo, Nitta-gun (JP); Yoshiaki Taniguchi, Iruma-gun (JP); Hideaki Fujii, Sawa-gun (JP); Yoichi Shindo, Kiryu (JP)

(73) Assignee: Mitsuba Corporation, Gunma (JP)

( * ) Notice: Subject to any disclaimer, the term of this patent is extended or adjusted under 35 U.S.C. 154(b) by 100 days.

(21) Appl. No.: 10/452,456

(22) Filed: Jun. 3, 2003

(65) Prior Publication Data

US 2003/0230942 A1 Dec. 18, 2003

(30) Foreign Application Priority Data

Jun. 13, 2002 (JP) ............................. 2002-172779

(51) Int. Cl.
*H02K 13/00* (2006.01)
*B62D 5/04* (2006.01)

(52) U.S. Cl. ...................... 310/64; 310/68 D; 361/704; 180/443

(58) Field of Classification Search .................. 310/64, 310/65, 68 D, 52; 180/443–446; 361/704
See application file for complete search history.

(56) References Cited

U.S. PATENT DOCUMENTS

| | | | | |
|---|---|---|---|---|
| 4,712,030 A | * | 12/1987 | Lakin et al. ................... | 310/89 |
| 5,315,194 A | * | 5/1994 | Brusasco et al. ......... | 310/68 R |
| 5,814,909 A | * | 9/1998 | Yamada et al. ............... | 310/64 |
| 6,123,167 A | * | 9/2000 | Miller et al. ................ | 180/444 |

FOREIGN PATENT DOCUMENTS

| | | |
|---|---|---|
| JP | 8-150945 | 6/1996 |
| JP | 8-192757 | 7/1996 |
| JP | 9-030434 | 2/1997 |
| JP | 9-117093 | 5/1997 |
| JP | 10-086831 | 4/1998 |
| JP | 11-115775 | 4/1999 |
| JP | 2000-177612 | 6/2000 |
| JP | 2000-190856 | 7/2000 |
| JP | 2001-213336 | 8/2001 |
| WO | 98/10971 | 3/1998 |

* cited by examiner

*Primary Examiner*—Burton S. Mullins
*Assistant Examiner*—David W. Scheuermann
(74) *Attorney, Agent, or Firm*—Wenderoth, Lind & Ponack, L.L.P.

(57) ABSTRACT

A circuit-container unit 22 has a structure in which a board 26, electric components 27 constituting a drive control circuit 24, a frame 28 made of synthetic resin, an insulating plate 29 made of synthetic resin, a shield plate 31 made of aluminum, and a cover 32 made of synthetic resin are stacked over a unit body 25 made of aluminum. The unit body 25 is constituted by a mount part 33 and a plate-like base part 34. Component-container portions 36a and 36b are projected in the lower surface side of the base part 34. The component-container portions 36a and 36b are provided to be projected into a gap between the base part 34 and a motor body. The insides of the component-container portions 36a and 36b serve as container spaces 38. FETs 27a which are short in height are provided on the board 26. Tall capacitors 27b and relays 27c are contained in the component-container portions 36a and 36b. Useless space over the components is thus saved and the space efficiency is improved.

9 Claims, 6 Drawing Sheets

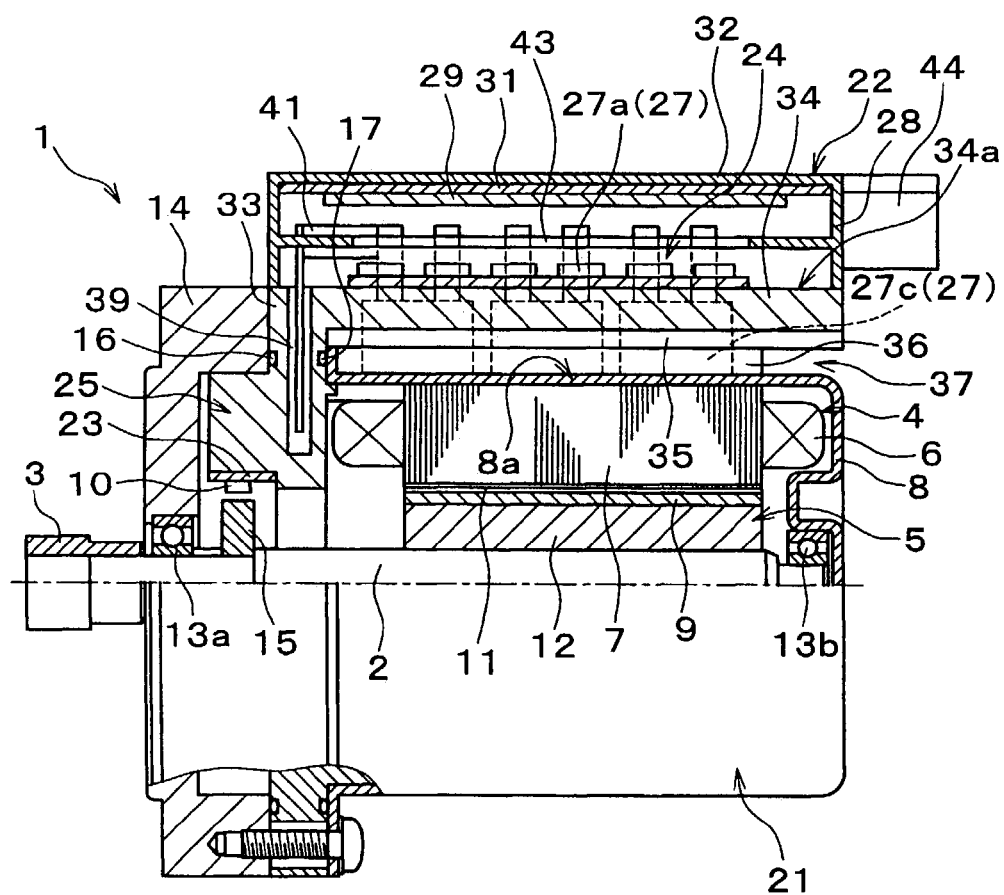
F I G. 3

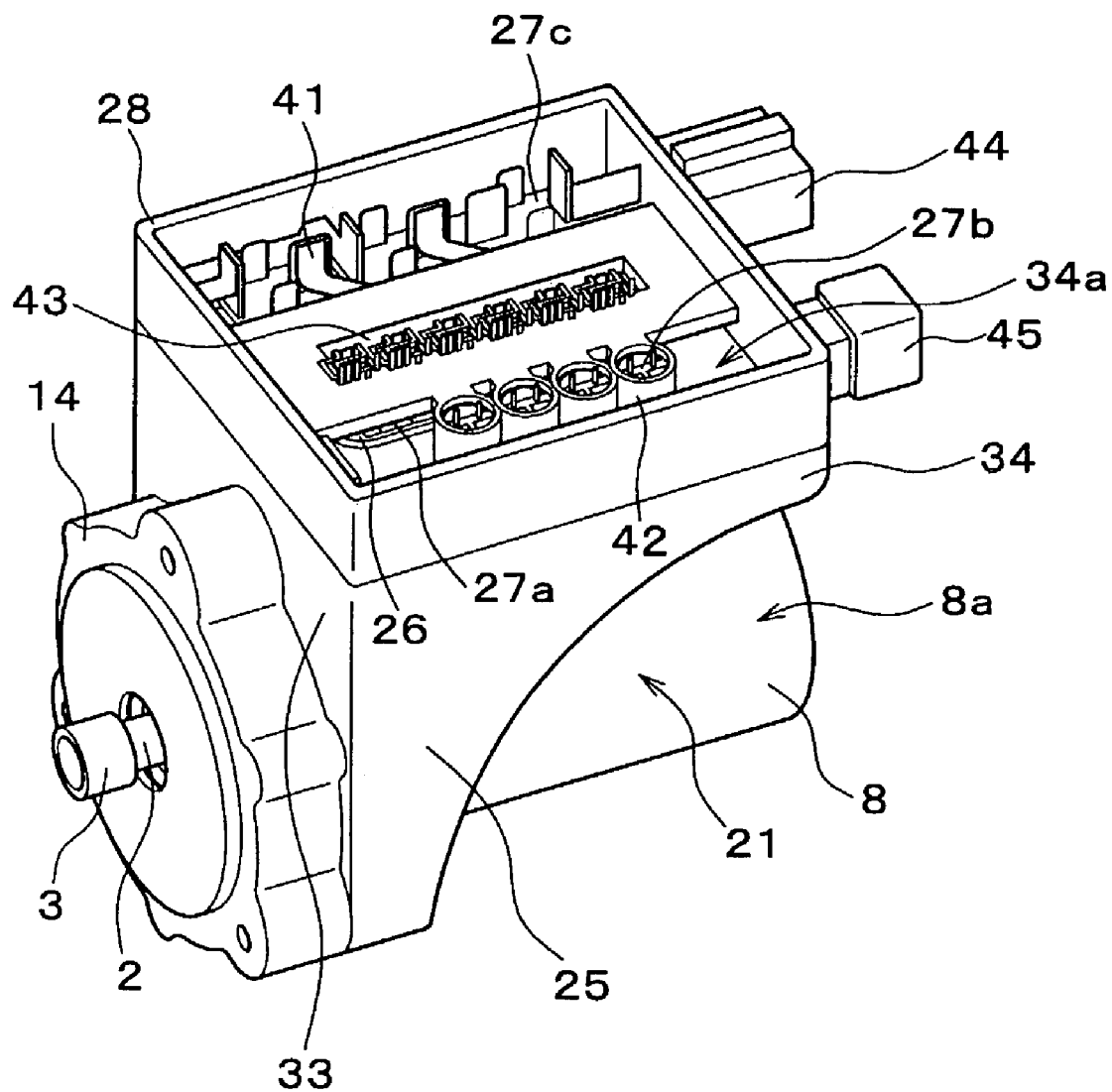
F I G. 6

MOTOR

BACKGROUND OF THE INVENTION

1. [Field of the Invention]

The present invention relates to a motor having a drive control circuit, and particularly, to a technique effectively applied to a brushless motor for use in an electric power steering apparatus.

2. [Related Art Statement]

In recent years, many proposals have been made for motors in which a drive control circuit for selecting an exciting coil or for controlling the amount of supplied power is integrated with a motor body, to respond to demands for downsizing and modularizing of devices. For example, Japanese Patent Application Laid-Open Publication No. 2001-213336 discloses an electric hydraulic power steering apparatus in which a DC brushless motor and a drive control circuit of the motor are incorporated together. Further, Japanese Patent Application Laid-Open Publications No. 2000-177612, No. 10-86831 and No. 8-150945 each disclose a structure in which a motor having a brush is integrated with a drive control circuit.

However, in this kind of motor integrated with a circuit, a board mounting electric components is contained in a housing. In this structure, a unit containing a circuit is merely integrated with a motor body. A problem hence arises in that the size of the apparatus is enlarged by dimensions equivalent to the unit. The electric components mounted on the board have various shapes and sizes. If those components are mounted on a flat board, the housing must be shaped to fit the tallest component. A useless space then appears over shorter components. Although the above publications provide some countermeasures by bending the board into an L-shape to extend along the outer surface of a gearbox, for example, a useless space still remains over smaller components. The space efficiency therefore deteriorates in the area of the unit and hinders downsizing of the motor.

SUMMARY OF THE INVENTION

The present invention has an object to improve space efficiency of a unit containing a circuit and to further downsize a motor.

A motor according to the present invention has a motor body, a drive control circuit which controls a power to be supplied to the motor body, and a circuit-container unit attached to the motor body, wherein the circuit-container unit has a plate-like base part and a component-container portion formed in the base part in a side close to the motor body, the component-container portion projecting into a gap between the base part and the motor body and forming internally a space open in a surface of the base part opposite to the motor body.

According to the motor of the present invention, tall components can be contained in the component-container portion. Therefore, no useless space is created above components even when components having various dimensions are wired. As a result, the space efficiency of the inside of the circuit-container unit can be improved, so that the height of the unit can be reduced and the motor can be downsized.

In the motor described above, the circuit-container unit may have a mount part fixed to the motor body, and the base part may be extended from the mount part in an axial direction of the motor. Also, the motor may have a structure in which the gap between the base part and the motor body increases along an outer circumferential surface of a cylindrical case of the motor body.

Further, the space of the component-container portion may be formed to have a depth which allows a terminal of an electric component contained in the space of the component-container portion and a terminal of an electric component provided on the base part to be aligned at substantially equal heights. In addition, the terminal of the electric component contained in the space of the component-container portion and the terminal of the electric component provided on the base part may be positioned at substantially equal heights. As a result, wirings between components can be provided more easily because the terminals are aligned at substantially equal heights. The quantity of wirings and the number of man-hour for providing wirings can be reduced, so that costs can be reduced.

Meanwhile, the motor according to the present invention may comprise: a stator having a core on which a coil is wound around and a case containing the core; a bracket provided at an end side of the case; a rotor having plural magnet poles and provided to be rotatable inside an inner circumference of the stator; and a rotation detector element which detects a rotation angle of the rotor, wherein the motor may be a brushless motor in which power supply to the coil is controlled by the drive control circuit, based on an output signal from the rotation detector element. Although a drive control circuit is indispensable to a brushless motor, the present invention provides a small brushless motor with which a compact circuit-container unit is integrated.

The motor described above may be a motor used for an electric power steering apparatus which supplies a steering mechanism of a vehicle with a steering-assistance force. By use of the motor, a compact electric power steering apparatus can be provided. Accordingly, the weight of the apparatus is reduced, and the degree of freedom in designing a car-mount layout increases.

The above-described and other objects, and novel feature of the present invention will become apparent more fully from the description of the following specification in conjunction with the accompanying drawings.

BRIEF DESCRIPTION OF THE DRAWINGS

FIG. 3 is a cross-sectional view of the motor shown in FIG. 1;

FIG. 6 is a perspective view showing a state where a frame is attached to the unit body.

DESCRIPTION OF THE PREFERRED EMBODIMENT

Figure 1:
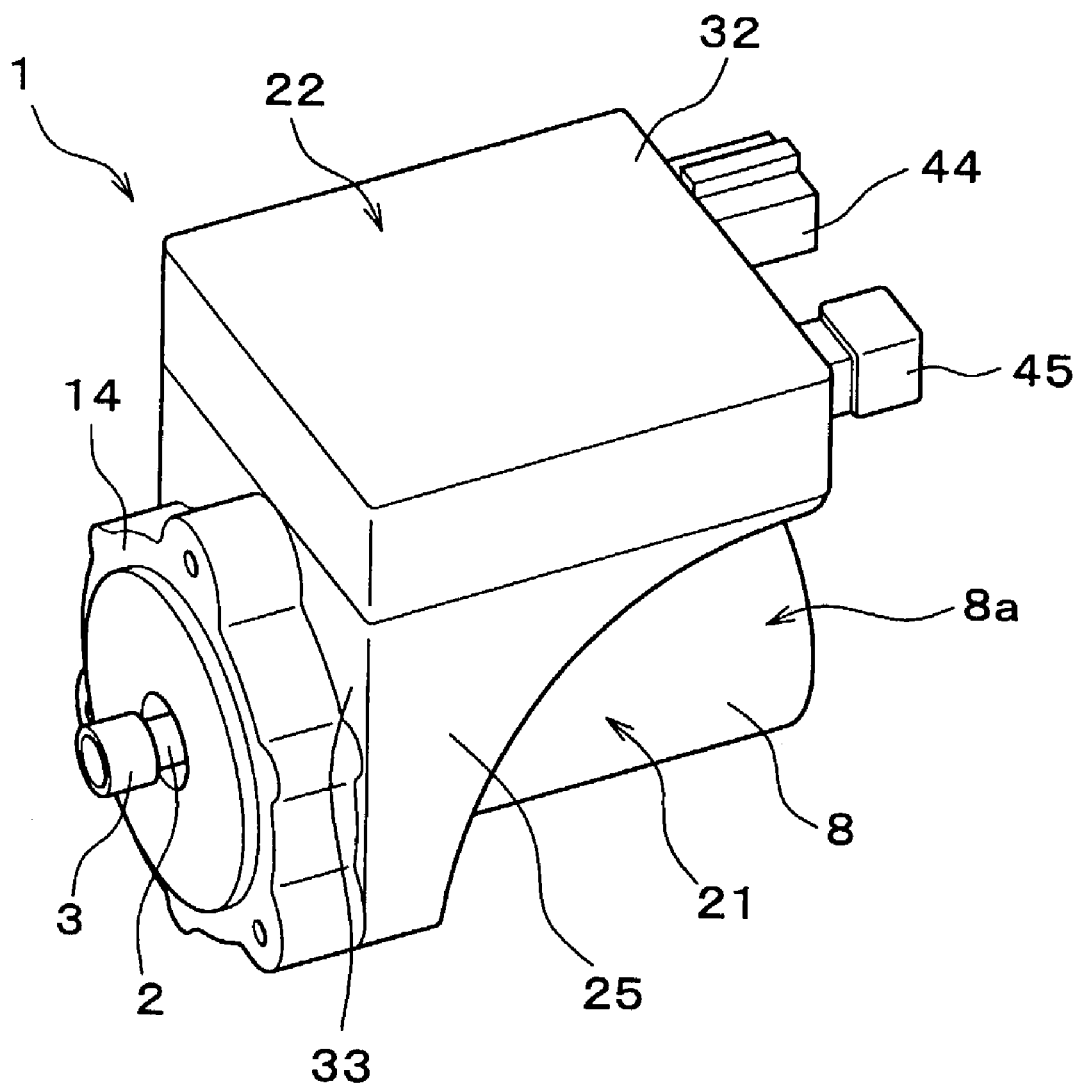
FIG. 1 is a perspective view of a motor according to an embodiment of the present invention, observed from the front upper side of the motor.
Figure 2:
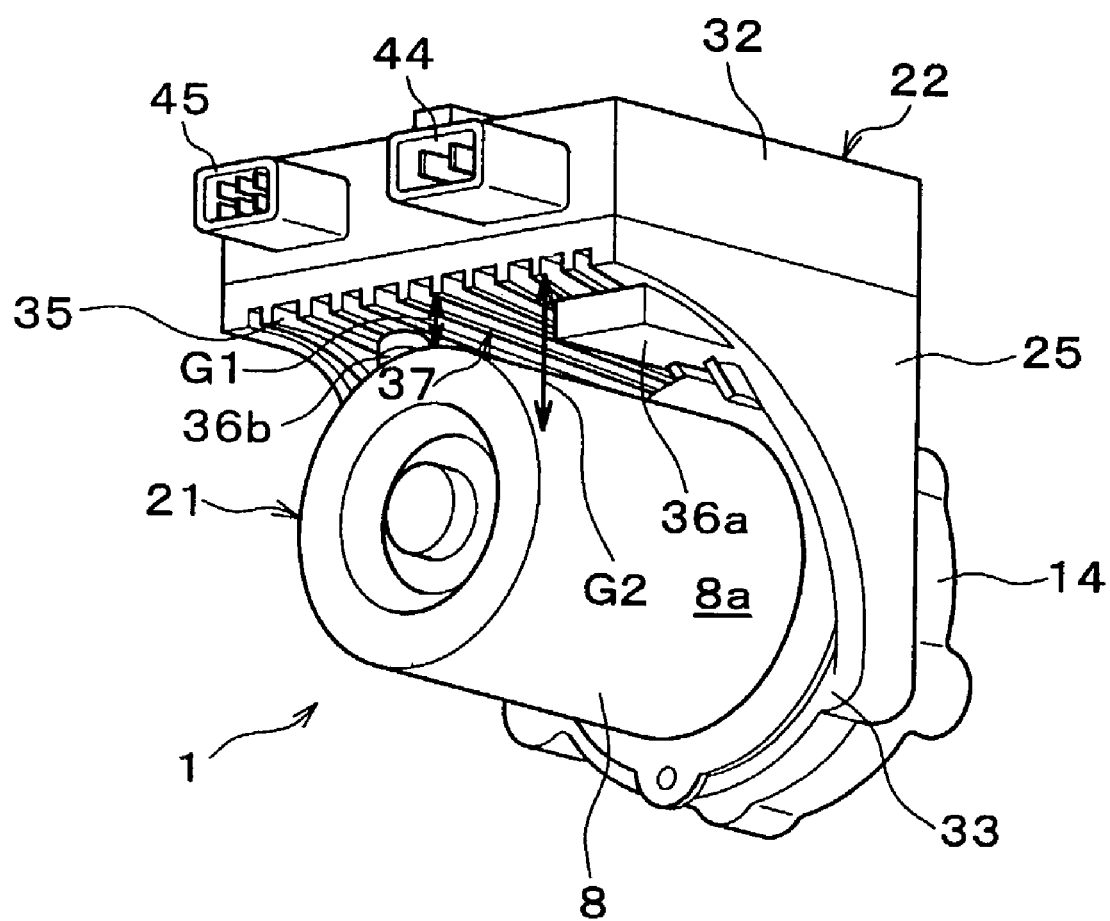
FIG. 2 is a perspective view of the motor shown in FIG. 1, observed from the rear lower side of the motor.

An embodiment of the present invention will now be described in detail on the basis of the drawings. FIG. 1 is a perspective view of a motor according to an embodiment of the present invention, observed from the front upper side of the motor. FIG. 2 is a perspective view of the motor shown in FIG. 1, observed from the rear lower side of the motor. FIG. 3 is a cross-sectional view of the motor shown in FIG. 1.

The motor 1 shown in FIG. 1 is used as a drive source of an electric power steering apparatus. As a driver operates a steering wheel, the motor 1 supplies a steering assistance force in accordance with a steering angle of the steering wheel and/or a driving speed of a vehicle. A rotor shaft 2 of the motor 1 is connected to an input shaft of a gearbox (not shown), via a joint 3. Rotation of the shaft 2 is appropriately decelerated in the gearbox and then transmitted to a steering column. The rotary motion of the steering column is converted into reciprocating motion of a tie-rod in the rack-and-pinion type steering gear section to turn the steering wheels of the automobile. With this arrangement, the steering force is assisted by the rotary power of the motor 1 so that the driver can operate the steering wheel with relatively small force.

As shown in FIG. 3, the motor 1 is constructed in a structure in which a motor body 21 and a circuit-container unit 22 are integrated with each other. The motor 1 is a brushless motor of an inner rotor type in which a rotor 5 is provided rotatably in a stator 4. A Hall element (rotation detector element) 10 detects the rotational position of the rotor 5. The stator 4 is constituted by a stator core 7 provided with a wound coil 6, and a metal case 8 which contains the stator core 7. The stator core 7 is formed by stacking metal plates. The coil 6 is wound around a convex pole projected in the inner circumferential side of the stator core 7.

The rotor 5 is constituted by the shaft 2, a rotor magnet 9 fixed to the shaft 2, and a magnet cover 11 armored on the magnet 9. A cylindrical rotor core 12 is formed on the shaft 2. The magnet 9 which is cylindrical is fixed to the outer circumference of the core 12. Also, the shaft 2 is supported rotatably by a bracket 14 and the case 8 by bearings 13a and 13b. The bracket 14 is an aluminum-die-cast member. The bearing 13a is contained and fixed to a center portion of the bracket 14. The case 8 is a metal cylindrical member, and the bearing 13b is fixed to the center of an end portion of the case 8.

The circuit-container unit 22 is inserted between the bracket 14 and the case 8. As shown in FIG. 3, a board 23 mounting the Hall element 10 is installed in the inside of the unit 22. Also, the unit 22 contains a drive control circuit 24 which controls the electric power to be supplied to the coil 6, based on a signal from the Hall element 10.

A sensor magnet 15 is provided inside the Hall element 10, and is fixed to the shaft 2. In the magnet 15, the same numbers of magnetic poles are formed at the same positions as the magnetic poles of the magnet 9. As the shaft 2 rotates, the magnet 15 rotates near the Hall element 10. An output signal from the Hall element 10 changes between HI and LO as the magnetic polarity changes. The drive control circuit 24 senses changes of the output signal to detect the rotational position of the shaft 2, and accordingly supplies an electric power to the coil 6.

Figure 4:
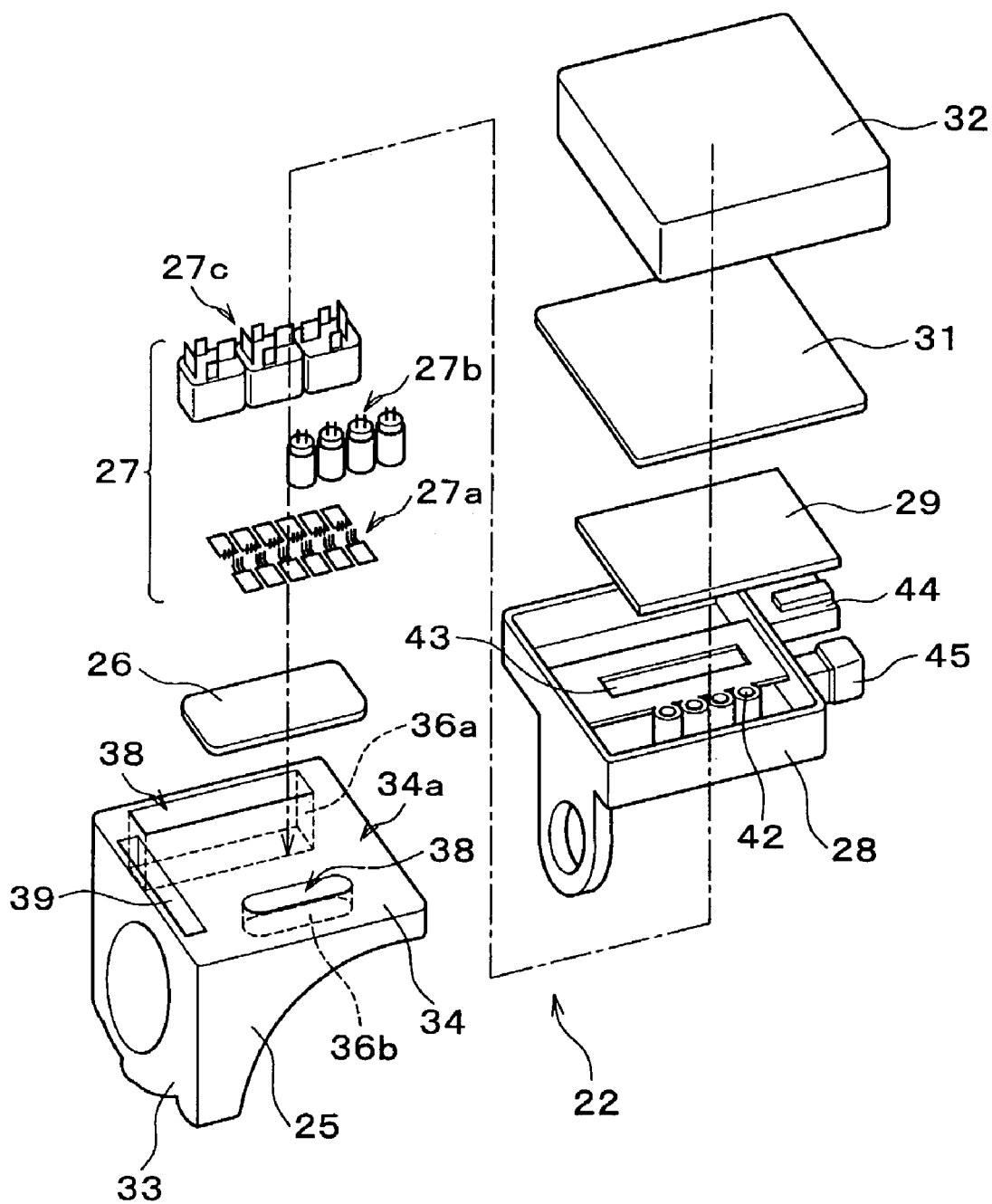
FIG. 4 is an exploded perspective view showing the structure of a circuit-container unit.

FIG. 4 is an exploded perspective view showing the structure of the unit 22. As shown in FIG. 4, the unit 22 has a structure in which a board 26 and electric components 27 and the like are stacked on a unit body 25 made of aluminum. The electric components 27 and the like constitute the circuit 24. The unit body 25 is constituted by a mount part 33 which is sandwiched between the bracket 14 and the case 8, and a base part 34 like a flat plate which is formed integrally at an outer end portion of the mount part 33. The mount part 33 is connected air-tightly with the bracket 14 and the case 8 by O-rings 16 and 17 inserted therebetween.

The base part 34 is provided along the axial direction, i.e., the extending direction of the shaft 2 such that the base part 34 extends from the mount part 33 and faces the outer circumferential surface of the case 8. Heat radiation fins 35 and component-container portions 36a and 36b are projected in the side of the lower surface of the base part 34. The component-container portions 36a and 36b are provided, each projecting in a gap 37 between the base part 34 and the case 8. The insides of the component-container portions serve as container spaces 38. The container spaces 38 are open to a base surface 34a of the base part 34.

The gap 37 formed between the plate-like base part 34 and the cylindrical case 8 is, as shown in FIG. 2, narrow at the center portion in the upper end of the case 8 (dimension G1). However, the gap 37 increases along the outer circumferential surface 8a of the case 8 (dimension G2). In a conventional motor, a space corresponding to the gap 37 is used merely to radiate heat and is dealt with as a dead space. In contrast, the present invention pays much attention to this space. In the motor 1, the component-container portions 36a and 36b are provided and projected in the space. The inside of each of the portions 36a and 36b is used as a container space 38 which can contain tall electric components. Note that the base part 34 does not always exclude a curved shape but may have an appropriate curved shape without deviating from the scope of the present invention.

In the unit body 25, the container spaces 38 inside the component-container portions 36a and 36b are open on the base surface 34a of the base part 34. Also, a connection hole 39 for connection to the board 23 is formed on the base surface 34a. A board 26 is mounted on the base surface 34a. Among the electric components 27, shorter (in height) FETs 27a are provided on the board 26. Meanwhile, the component-container portion 36a has the container space 38 having a shape like an elongated-hole. Capacitors 27b are contained in the container space 38. In addition, the component-container portion 36b is formed to be wider and deeper than the other portion 36a. A relay 27c is contained in the component-container portion 36b.

Figure 5:
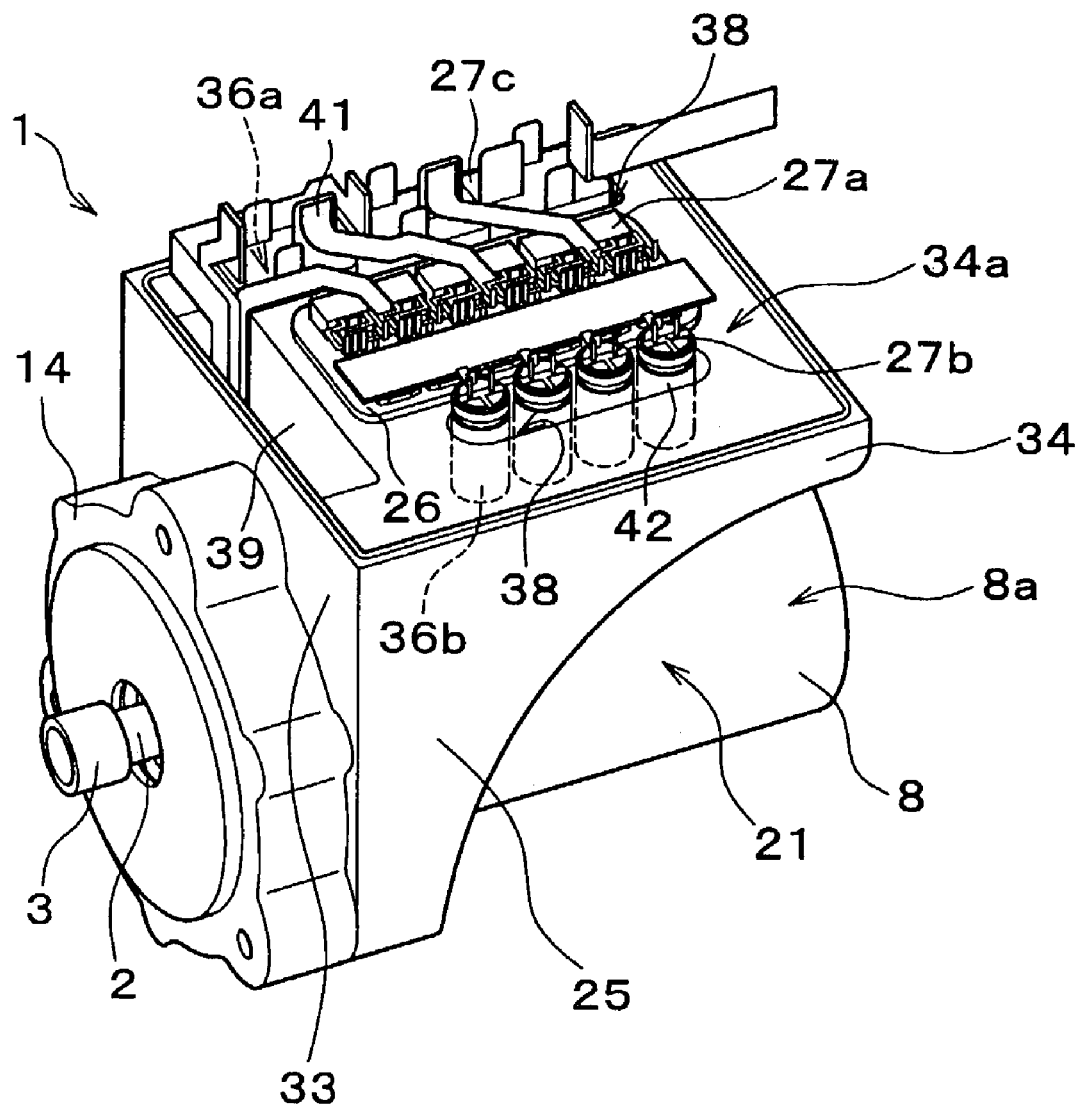
FIG. 5 is a perspective view showing a state where electric components are attached to a unit body.

FIG. 5 is a perspective view showing a state where the electric components 27 are attached to the unit body 25. As shown in FIG. 5, the respective components contained in the component-container portions 36a and 36b are contained in the spaces 38. Terminals of the components appear above the base surface 34a. The terminals of the respective electric components 27 are arranged at the substantially same level above the base surface 34a. That is, all the electric components including tall and short ones have their terminals aligned at a substantially equal height, regardless of their dimensions. Accordingly, no useless space appears above the components even when components having various dimensions are contained. The space efficiency in the unit 22 is thus improved, so that the whole height of the unit can be suppressed to be short and the motor can be downsized. In addition, since the terminals are aligned at an equal height, wirings can be easily provided among respective components. The quantity of wirings and the number of man-hours for providing the wirings can hence be reduced so that costs can be lowered. Note that heat from the electric components 27 is radiated to the bracket 14 made of aluminum die cast, the case 8 made of metal, and the like via the unit body 25 made of aluminum.

After providing the electric components 27, wirings 41 are provided between the components 27 and the board 23. A frame 28 made of synthetic resin is attached to the base surface 34a. FIG. 6 is a perspective view showing a state where the frame 28 is attached to the unit body 25. The frame 28 is provided with a capacitor container portion 42 for containing the capacitors 27, and a terminal-container hole 43 for containing the terminals of the FETs 27a. Provided at an end side of the frame 28 are a power line coupler 44 for supplying electric power, and a signal-line coupler 45 for connecting the drive control circuit 24 to an external controller.

An insulating plate 29 made of synthetic resin is mounted on the frame 28. Further, a shield plate 31 made of aluminum is mounted on the insulating plate 29. A cover 32 made of synthetic resin is further attached from above. The terminals of the electric components 27 and the shield plate 31 are electrically insulated from each other by the insulating plate 29. Also, influences from external noise are shielded by the shield plate 31. The cover 32 shields the inside of the unit 22 against external heat.

Detailed description has hereinabove been given of the invention achieved by the present inventors with reference to the embodiment. However, the present invention should not be limited to the embodiment described above, and may be variously modified within the scope not departing from the gist.

The embodiment described above shows an example in which capacitors and relays are contained in the component-container portions 36a and 36b. However, electric components which the portions 36a and 36b can contain are not limited to them. The positions where the component-container portions 36a and 36b are set can be changed appropriately, depending on the dimensions of the gap 37, the heights of components to be contained, the wirings, and the like. Although the above embodiment suggests holes extending along the axial direction, the component-container portions may be provided and extending in a direction perpendicular to the axial direction (e.g., in the same direction as the connection hole 39). In this case, the container spaces 38 can be formed to have stepped depths in accordance with the dimensions of the gap 37.

Meanwhile, the above embodiment deals with a brushless motor for use in an electric power steering apparatus, as a motor to which the present invention is applied. The type of motor is not limited to the brushless motor but the present invention is applicable to a motor with a brush. In addition, use of the motor is not only for an electric power steering apparatus of a column assistance type but also for electric power steering apparatuses of other types and electric hydraulic power steering apparatuses. Further, the present invention is applicable to other purposes than electric power steering apparatuses, e.g., industrial machines such as robots and the like, and IT devices such as personal computers and the like.

According to the motor of the present invention, component-container portions having internal spaces for containing electric components are provided in a base part of a circuit-container unit in the side of a motor body, with the component-container portions projected in the gap created between the base part and the motor body. Tall components can therefore be contained in the component-container portions. Accordingly, no useless space is created above components even when components having various dimensions are provided and wired. As a result, space efficiency inside the circuit-container unit can be improved, and the whole height of the unit can be suppressed to be short. The motor can thus be downsized.

What is claimed is:

1. A motor comprising:
    a motor body;
    a drive control circuit which controls power to be supplied to said motor body; and
    a circuit-container unit attached to said motor body;
    wherein said circuit-container unit includes a plate-like base part spaced apart from said motor body so that a space is formed between said motor body and said plate-like base part;
    wherein said motor body and said plate-like base part are arranged such that a distance between said plate-like base part and a center portion of said motor body is smaller than distances between said plate-like base part and side portions of said motor body, such that said space formed between said plate-like base part and said motor body increases from said center portion of said motor body outwardly toward said side portions of said motor body;
    wherein said circuit-container unit includes a plurality of discrete component-container portions projecting in said space formed between said motor body and said plate-like base part from said plate-like base part toward said motor body;
    wherein said component-container portions are shaped and arranged so as to have varying lengths in a direction from said plate-like base part toward said motor body;
    wherein said drive control circuit comprises plural electric components disposed in said component-container portions, respectively; and
    wherein said plural electric components respectively include terminals provided on said plate-like base part so that the terminals are aligned at substantially equal heights, and said electric components have varying heights so that said electric components respectively extend from said plate-like base part toward said motor body to varying distances away from said plate-like base part.

2. The motor according to claim 1, wherein
    said component-container portions are shaped and arranged so that said lengths of said component-container portions in the direction from said plate-like base part toward said motor body are smaller adjacent a center of said motor body than toward said side portions of said motor body.

3. The motor according to claim 2, wherein
    said electric components are disposed within said component-container portions such that electric components of greater height are disposed further toward the side portions of said motor body than are electric components of smaller height.

4. The motor according to claim 1, wherein
    said circuit-container unit further includes a mount part, said mount part is fixed to said motor body at an axial end of said motor body, and said plate-like base part is attached to said mount part and extends therefrom.

5. The motor according to claim 1, wherein said motor body comprises:
    a stator having a stator core, a coil wound around said stator core, and a case containing said stator core;
    a bracket provided at an end side of said case;
    a rotor having plural magnetic poles and provided to be rotatable inside an inner circumference of said stator; and
    a rotation detector element which detects a rotation angle of said rotor;
    wherein said motor is a brushless motor in which power supply to said coil is controlled by said drive control circuit based on an output signal from said rotation detector element.

6. The motor according to claim 1, wherein said motor constitutes an electric power steering motor for supplying steering-assistance force to a steering mechanism of a vehicle.

7. The motor according to claim 1, wherein
other than space within said component-container portions, said space formed between said motor body and said plate-like base part is not enclosed, such that outer surfaces of said component-container portions are exposed.

8. The motor according to claim 1, wherein
a synthetic resin frame is attached to said plate-like base part on a side of said plate-like base part opposite said motor body.

9. The motor according to claim 1, wherein
a synthetic resin insulating plate is mounted on said frame, and a metal shield plate is mounted on said insulating plate.

* * * * *